United States Patent [19]
Miyakawa et al.

[11] 4,212,501
[45] Jul. 15, 1980

[54] VEHICULAR ANTI-SKID BRAKE DEVICE

[75] Inventors: Yoshitaka Miyakawa, Kawagoe; Makoto Sato, Kamifukuoka; Etsuo Fujii, Wako, all of Japan

[73] Assignee: Honda Giken Kogyo Kabushiki Kaisha, Tokyo, Japan

[21] Appl. No.: 965,306

[22] Filed: Nov. 29, 1978

[30] Foreign Application Priority Data

Jun. 28, 1978 [JP] Japan .................................. 53-78442
Aug. 10, 1978 [JP] Japan .................................. 53-97722
Sep. 20, 1978 [JP] Japan .................................. 53-116263

[51] Int. Cl.² ............................................ B60T 13/70
[52] U.S. Cl. .................................... 303/116; 303/119
[58] Field of Search ....................... 303/92, 93, 95, 96, 303/97, 98, 99, 105, 106, 113, 116, 117, 118, 119, 20, 6 R; 188/181

[56] References Cited

U.S. PATENT DOCUMENTS

3,744,852  7/1973  Riordan .............................. 303/20 X
4,129,342  12/1978  Sato et al. ............................. 303/105

Primary Examiner—Trygve M. Blix
Assistant Examiner—Reinhard J. Eisenzopf
Attorney, Agent, or Firm—Haseltine, Lake & Waters

[57] ABSTRACT

A vehicular anti-skid brake device comprising a hydraulically-operated braking device, an anti-skid hydraulic system for automatically controlling the braking force of the braking device relative to the wheels, and a valve responsive to brake oil pressure for annulling malfunction of the anti-skid hydraulic system when braking is not applied. The braking device comprises a brake oil chamber for generating a braking force and a control oil chamber for generating an anti-braking force against the braking force when the latter is excessive. The control oil chamber receives control oil pressure generated by a control oil pressure generating source and is under control of the anti-skid hydraulic system when braking is applied. The valve responsive to brake oil pressure is disposed in an oil passage which provides communication between the control oil pressure generating source and the control oil chamber, the valve being responsive to brake oil pressure generated by a brake oil pressure generating source to normally cut off control oil delivered from the control oil pressure generating source but permitting control oil to be delivered from the control oil pressure generating source when the brake oil pressure exceeds a predetermined pressure.

13 Claims, 9 Drawing Figures

VEHICULAR ANTI-SKID BRAKE DEVICE

BACKGROUND OF THE INVENTION

1. Field of the Invention

The present invention relates to a vehicular anti-skid brake device in which the control of a braking force of a braking device relative to the wheels, even if a control device for suppressing the braking force should malfunction while braking is not applied, there occurs no interruption in the braking operation of the braking device when braking is applied due to such malfunction of the control device.

2. Description of Prior Art

If the braking input to a wheel is excessive when rapid braking is applied to the vehicle, the wheel becomes locked, resulting not only in a lowering of the braking efficiency but also loss of directional stability and steering of the wheel, which is very dangerous. A so-called anti-skid brake device has been proposed for prevention of such a dangerous state.

A hydraulically-operated vehicular braking device provided with an anti-skid control device generally comprises a brake oil chamber for receiving brake oil pressure generated in accordance with the braking operation, and a control oil chamber for receiving control oil pressure against brake oil pressure when the braking force to the wheels is excessive. The device is so designed that when brake oil is introduced into the brake oil chamber, pressing frictional contact members such as a brake pad, brake shoe or the like are brought into frictional contact with rotary members such as a brake disk, brake lining or the like which rotate integral with the wheels, to be pressed so as to produce a braking torque, and when the braking torque at that time, that is, the braking force is excessive, control oil is introduced into the control oil chamber, and as a consequence, the pressing frictional contact member moves back from the rotary member.

Incidentally, if the control oil is introduced into the control oil chamber as a result of malfunction of the anti-skid control device when braking is not applied, a spacing between the pressing frictional contact member and the rotary member becomes greater than in normal condition so that the distance of movement of the pressing frictional contact member required for braking becomes greater than that in the normal case. Therefore, when the braking operation is effected in that state, the braking effect is different from that of the normal case, and the time at which the braking force is produced is delayed or there also occurs the possibility of not sufficiently producing the braking force as the case may be.

It can be said that there is total absence of possibility for the anti-skid brake device to undergo malfunction due to vibrations or shocks during travel of the vehicle or other causes. For these reacons, it is desirable that the anti-skid brake device is designed so that even if the anti-skid brake device should malfunction, the braking operation of the braking device would not inconveniently be affected thereby. In the past, anti-skid brake devices suited for the purposes noted above have not been proposed.

SUMMARY OF THE INVENTION

In accordance with the present invention, a vehicular anti-skid brake device comprises a hydraulically-operated braking device for imparting a braking force to the wheels in response to brake oil pressure generated in accordance with a braking input, an anti-skid hydraulic system for automatically controlling the braking force of the braking device to the wheels, and a valve responsive to brake oil pressure for annulling malfunction of the anti-skid hydraulic system when braking is not applied.

The aforesaid braking device is provided with a brake oil chamber actuated brake oil pressure generated by a brake oil pressure generating source to produce a braking force, and a control oil chamber actuated to receive control oil pressure generated by a control oil pressure generating source in a system separate from the brake oil pressure generating source.

The aforesaid valve responsive to brake oil pressure, which is disposed in an oil passage which connects the control oil pressure generating source with the control oil chamber, is responsive to brake oil pressure generated by the brake oil pressure generating source to normally cut off control oil delivered from the control oil pressure generating source but permit control oil delivered from the control oil pressure generating source to flow only when the brake oil pressure reaches a level in excess of a predetermined pressure.

Preferably, the aforesaid anti-skid hydraulic system comprises a normally closed control valve which is so controlled as to normally cut off control pressure oil after having passed through the valve responsive to brake oil pressure but to feed the control pressure oil after having passed through the valve responsive to brake oil pressure into a control oil chamber in the braking devices when the braking force of the braking devices is excessive; and a normally open control valve which is so controlled as to normally open control oil within the control oil chamber in the braking devices into an oil tank but to provide a cutting-off between the control oil chamber and the oil tank.

The aforesaid valves responsive to brake oil pressure may be operated by movement of a hydraulic piston responsive to brake oil pressure or by deformation of a diaphragm.

The aforesaid brake oil pressure generating source generally comprises a brake pedal, and a master cylinder, for example, the well-known tandem type master cylinder may be employed. While the valve responsive to brake oil pressure may be arranged at a position away from the master cylinder, it will be appreciated that the valve may also be constructed integrally with the master cylinder as the case may be. When the tandem type master cylinder is employed as the master cylinder, the brake oil pressure system may comprise a plurality of mutually independent brake oil pressure systems, whereby the oil pressure systems compensate for one another to thereby provide a safety arrangement and positive operation of both the braking device and the valve responsive to brake oil pressure.

It is therefore a primary object of the present invention to provide a vehicular anti-skid brake device in which even if an anti-skid control device involves a malfunction when braking is not applied, control oil is not introduced into the control oil chamber immediately as such malfunction occurs, and the spacing between a pressure frictional contact member such as a brake pad, brake shoe or the like and a rotary member such as a brake disk, brake liner or the like when braking is not applied is not increased due to the malfunction of the anti-skid control device.

It is a further object of the present invention to provide a vehicular anti-skid brake device in which a valve responsive to brake oil pressure is disposed within the control oil passage system, said valve normally cutting off control oil delivered from a control oil pressure generating source but permitting control oil delivered from the control oil pressure generating source to flow only when brake oil pressure reaches a level in excess of a predetermined pressure, whereby even if the anti-skid control device involves a malfunction, control oil is not introduced into the control oil chamber immediately as such malfunction occurs.

It is another object of the present invention to provide a vehicular anti-skid brake device in which it is possible for the aforesaid valve responsive to brake oil pressure to be operated accurately in response to brake oil pressure and yet is simple in construction.

It is yet another object to provide a vehicular anti-skid brake device in which a suitable type of master cylinder may be employed as the brake oil pressure generating source.

It is still another object of the present invention to provide a vehicular anti-skid brake device in which an accumulator is disposed on the output side of the control oil pressure generating source so that the control oil pressure system may be operated in smooth manner.

It is a further object of the present invention to provide a vehicular anti-skid brake device in which the aforesaid valve responsive to brake oil pressure may be arranged at a position remote from said master cylinder.

It is another object of the present invention to provide a vehicular anti-skid brake device in which the aforesaid valve responsive to brake oil pressure is connected to the master cylinder in integral fashion as necessary so as to directly receive brake oil pressure generated by the master cylinder for operation, thus minimizing the number of parts, simplifying the construction and rendering the operation positive.

It is another object of the present invention to provide a vehicular anti-skid brake device in which a braking device may comprise a hydraulically-operated braking device provided with a brake oil chamber and a control oil chamber of the suitable type capable of directly imparting a braking force to the wheels.

It is a further object of the present invention to provide a vehicular anti-skid brake device in which an oil pressure operating system may comprise a plurality of mutually independently operable oil pressure systems so that the oil pressure systems compensate for one another, with the result that it is possible to carry out the anti-skid control safely and positively.

It is a further object of the present invention to provide a vehicular anti-skid brake device which is simple in construction as a whole and small and light in weight.

DETAILED DESCRIPTION OF THE PREFERRED EMBODIMENTS

Figure 1:
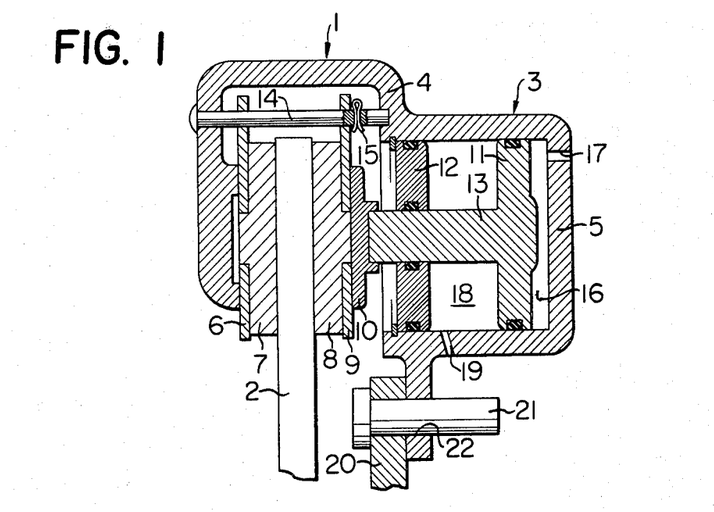
FIG. 1 is a sectional view of a principal part of one embodiment of a braking device.

Referring now to FIG. 1, there is shown a braking device 1 for wheels which comprises a pair of pads 7 and 8 for engaging a brake disk 2, which rotates with the wheels, therebetween for applying pressure to the disk from opposite sides thereof, and a hydraulically-operated device 3 so operated that the brake disk 2 may be held between the pads 7 and 8 and pressed from opposite sides thereof. A casing 4 of the braking device 1 supports the pad 7 through a mounting plate 6, and the casing 4 integrally forms a cylinder 5 of the hydraulically-operated device 3. The cylinder 5 is supported for movement at right angles to the brake disk 2 through the provision of the slidable engagement of a pin 21 secured to the vehicle body 20 in a hole 22 formed in an end edge of the cylinder.

A rod 13 of a piston 11 placed in slidable contact within the cylinder 5 extends through an end wall 12 formed at an inner end of the cylinder 5 so as to project toward the brake disk 2, a foremost end of rod 13 supporting the pad 8 through an end member 10 and a mounting plate 9. End edges of the mounting plates 6 and 9 extend upwardly and are slidably supported for movement at right angles to the brake disk 2 by a pin 14 secured to the casing 1. The pads 7 and 8 may be brought into frictional contact with the brake disk in a stabilized condition by means of the pin 14. The pin 14 receives therein a split pin 15 so as to restrict relative movement of the mounting plate 9 with respect to the pin 14.

A cylindrical chamber of the cylinder 5 is divided by the piston 11 into a brake oil chamber 16 in communication with an opening 17 and a control oil chamber 18 in communication with an opening 19. Accordingly, when pressure oil generated by a brake oil pressure generating source is introduced into the brake oil chamber 16, the piston 11 and the outer end wall of the cylinder 5 are urged to move apart from each other, as a consequence of which the pair of pads 7 and 8 apply pressure to the brake disk 2 from the opposite sides thereof to effect braking of the wheels. On the other hand, when pressure oil generated by a control oil pressure generating source is introduced into the control oil chamber 18, the piston 11 and the outer end wall of the cylinder 5 are urged to move in a direction towards each other, as a consequence of which the pressing action of the pads 7 and 8 on the brake disk 2 is released.

Figure 2:
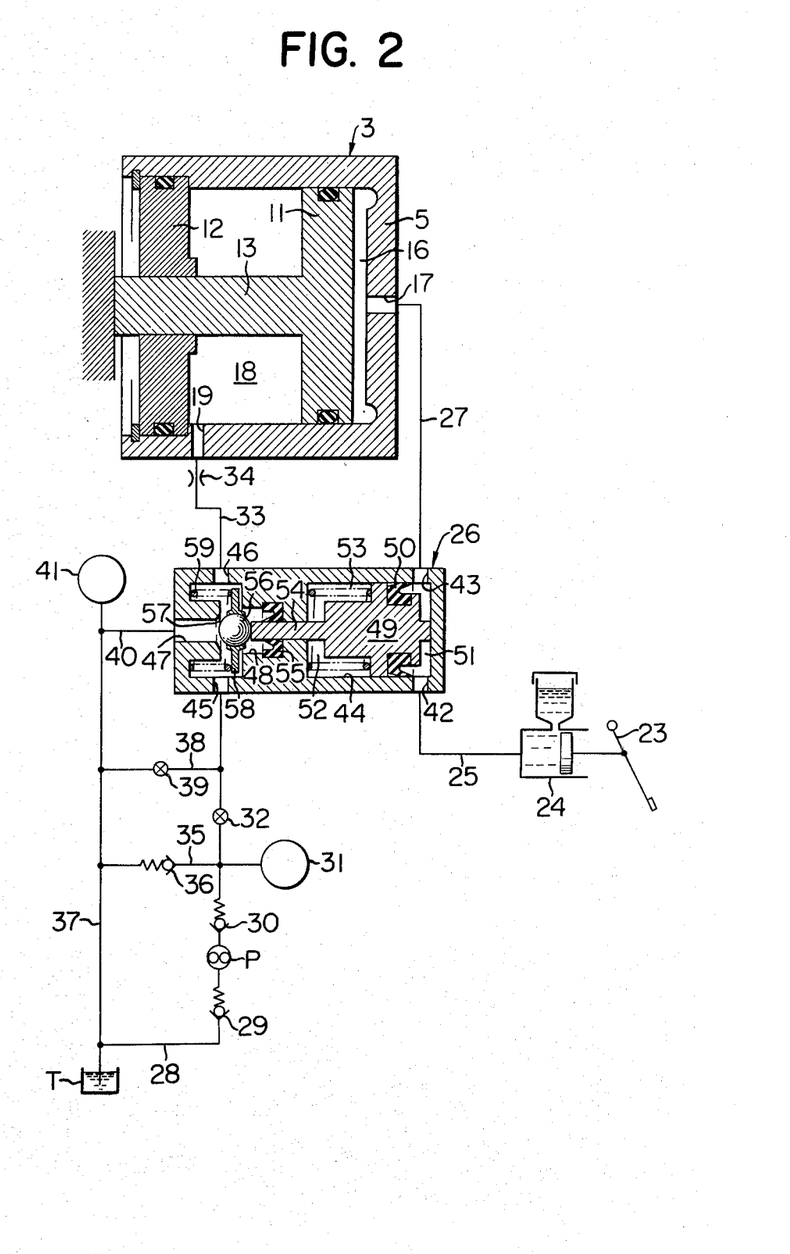
FIG. 2 shows an overall hydraulic system, with a main part shown in section on an enlarged scale, of one embodiment of a vehicular anti-skid brake device in accordance with the present invention connected to the braking device shown in FIG. 1.

In FIG. 2, pressure oil generated by a master cylinder 24 operated by a brake pedal 13 is fed into the brake oil chamber 16 via an oil passage 25, a valve 26 responsive to brake oil, and oil passage 27 and the opening 17, whereas pressure oil sucked from an oil tank T via oil passage 28 and a check valve 29 and pressurized by a pump P is introduced into the control oil chamber 18 via a check valve 30, an accumulator 31, a normally closed control valve 32, a valve 26 responsive to brake oil pressure, an oil passage 33, an orifice 34 and opening 19.

The portion of the oil passage 28 between the check valve 30 and the normally closed control valve 32 is in communication with the oil tank T via an oil passage 35, a relief valve 36 and an oil passage 37, whereas the portion of the oil passage 28 between the normally closed control valve 32 and the valve 26 responsive to brake oil pressure is in communication with the oil tank T via an oil passage 38, a normally open control valve 39 and oil passage 37. The operation and control of the control valves 32 and 39 are automatically effected in accordance with the control from a command system (not shown). The command system may be of the conventional type which can sense a skid of the wheels relative to the surface on which they travel resulting from a sudden variation in angular acceleration of wheels and signals a changeover operation to the control valves 32 and 39 to produce an unbraking force when necessary on the basis of information related to the obtained braking force. Thus, when the normally closed control valve 32 is opened while the normally open control valve 39 is closed, control pressure oil generated by the pump P is fed to the valve 26 responsive to brake oil, and when the normally closed control valve 32 is closed, pressure oil generated by the pump P is returned to the oil tank T via the oil passage 35, the relief valve 36 and the oil passage 37.

The valve 26 responsive to brake oil pressure has a cylindrical chamber 44 and a valve chamber 48, the chamber 44 being brought into communication with the oil passage 25 through an opening 42 by a piston 49 provided with a seal member 50 along an outer peripheral portion thereof and being divided into an oil chamber 51 in communication with the oil passage 27 through an opening 43 and a spring chamber 52 accommodating therein a bias spring 53. A rod 54 of the piston 49 extends in slidable relation through a partitioning wall between the chamber 44 and the valve chamber 48 and through a seal member 55 disposed at an end wall of the valve chamber 48 so as to project into the valve chamber 48, a foremost end of rod 54 bearing on a ball valve 56 supported in the center of an annular plate 58 biased by a bias spring 59 within the valve chamber 48 towards the chamber 44. The valve chamber 48 is in communication with the oil passage 28 through an opening 45, in communication with the oil passage 33 through an opening 46, and in communication with the oil passage 40 through an opening 47. This oil passage 40 is in communication with the oil tank T and with a low pressure accumulator 41 via the oil passage 37. The valve ball 56 is normally in a position spaced from a valve seat 57 formed in an inner end edge of the opening 47, under the biasing force of the bias spring 59 so that the chamber 48 communicates with the oil passage 40. However, when brake pressure oil in excess of a predetermined pressure is introduced into the oil chamber 51, the piston 49 is moved against the biasing force of the bias spring 53 and accordingly the valve ball 56 is urged by the rod 54 and moved back against the biasing force of the bias spring 59, and as a result, the valve ball 56 bears on the valve seat 57 to close the opening 47.

As constructed above, when an operator steps on the brake pedal, brake oil pressure is generated in the master cylinder 24 so that brake pressure oil delivered from the master cylinder 24 is introduced into the brake oil chamber 16 via the oil passage 25, the oil chamber 51 and the oil passage 27 to urge the piston 11 to move in the direction to apply pressure to the brake disk 2. During that period of time, the normally closed control valve 32 remains closed as long as the braking force of the braking device 1 is properly maintained and the opening 47 remains opened as long as the brake oil pressure within the oil chamber 51 does not reach a predetermined level, and hence, working oil within the control oil chamber 18 passes through the oil passage 33 and the valve chamber 48, after which it further passes through the oil passage 40, the low pressure accumulator 41 and the oil passage 37 and also through the oil passage 38, the normally open control valve 39 and the oil passage 37 for discharge into the oil tank T.

In this state, even if the normally closed control valve 32 is erroneously opened while the normally open control valve 39 closed due to a certain disturbance or the like, control pressure oil delivered from the pump P flows into the valve chamber 48, after which it is discharged into the oil tank T via the opening 47, the oil passage 40, the low pressure accumulator 41 and the oil passage 37. Since orifice 34 is disposed in the oil passage 33, the fluid resistance in the orifice 34 causes pressure oil within the valve chamber 48 to flow toward the oil passage 40 in which fluid resistance is not present.

When brake oil pressure within the oil chamber 51 reaches a level in excess of a predetermined pressure, the valve ball 56 is urged by the rod 54 of the piston 49 to close the opening 47. When the anti-skid device is actuated to open the normally closed control valve 32 and close the normally open control valve 39, control valve 39, control pressure oil generated by the pump P is introduced into the control oil chamber 18 via the valve chamber 48 and the oil passage 33. As a result, the piston 11 is urged toward the brake oil chamber 16 to suppress the braking operation of the braking device 1.

Figure 3:
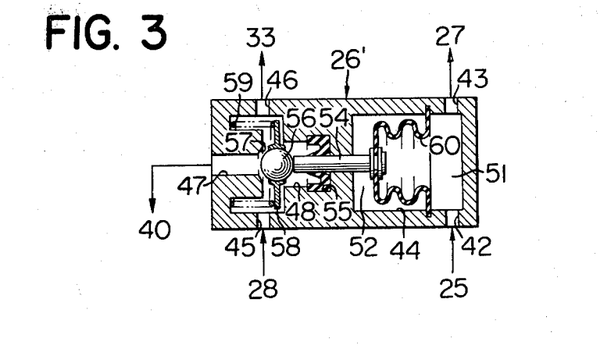
FIG. 3 is a longitudinal sectional view showing another embodiment of a valve responsive to brake oil pressure in FIG. 2.

A further embodiment of the valve responsive to brake oil pressure shown in FIG. 2 is shown at 26' in FIG. 3. In valve 26' like reference numerals in FIG. 2 designate parts exactly corresponding to the valve 26. The valve 26' responsive to brake oil pressure in FIG. 3 has a diaphragm 60 in place of the piston 49 in FIG. 2, and the chamber 44 is divided by the diaphragm 60 into the oil chamber 51 and the chamber 52. With this construction, the construction becomes simple, the weight is reduced, and leakage of pressure oil between the oil chamber 51 and the chamber 52 may be avoided.

Figure 4:
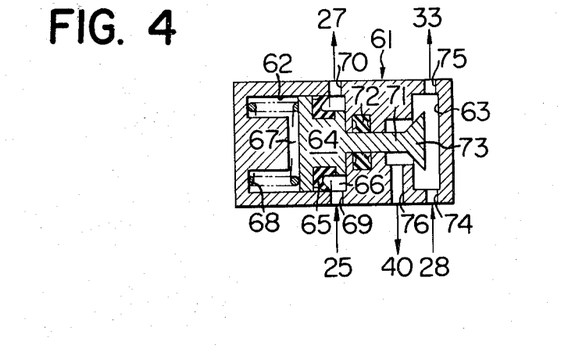
FIG. 4 is a longitudinal sectional view showing a further embodiment of a valve responsive to brake oil pressure.

A still another embodiment of the valve responsive to brake oil pressure is shown in FIG. 4. Therein, a valve 61 responsive to brake oil pressure has a cylindrical chamber 62 and a valve chamber 63, and a piston 64, which is provided with a seal member 65 along the outer peripheral portion thereof and placed in slidably contacting relation within the cylindrical chamber 62, divides the chamber 62 into an oil chamber 66 in communication with the oil passage 25 through an opening 69 and in communication with the oil passage 27 through an opening 70, and a spring chamber 67 accommodating a bias spring 68 therein. A rod 71 of the piston 64 extends through a wall between the chamber 62 and the valve chamber 63 and through a seal member 72 disposed within the wall so as to project into the valve chamber 63, a foremost end of rod 71 being formed with a valve body 73. The valve chamber 63 is in communication with the oil passage 28 through an opening 74, in communication with the oil passage 33 through an opening 75, and in communication with the oil passage 40 through an opening 76. The piston 64 is biased by the bias spring 68 as long as the brake oil pressure within the oil chamber 66 does not reach a predetermined level, and accordingly, the valve body 73 causes the opening 76 to be open, and the oil passage 28 and the coil passage 33 are both in communication with the oil passage 40 through the valve chamber 63. On the other hand, when the brake oil pressure within the oil chamber 66 reaches a predetermined level, the piston 64 is displaced against the biasing force of the bias spring 68, and as a result the valve body 73 causes the opening 76 to be closed off. At this time, the anti-skid device is actuated to open the normally closed control valve 32 and close the normally open control valve 39. Then, control pressure oil delivered from the pump P is introduced into the control oil chamber 18 via the valve chamber 63, as a consequence of which the hydraulically-operated device 3 produces an unbraking operation.

Figure 5:
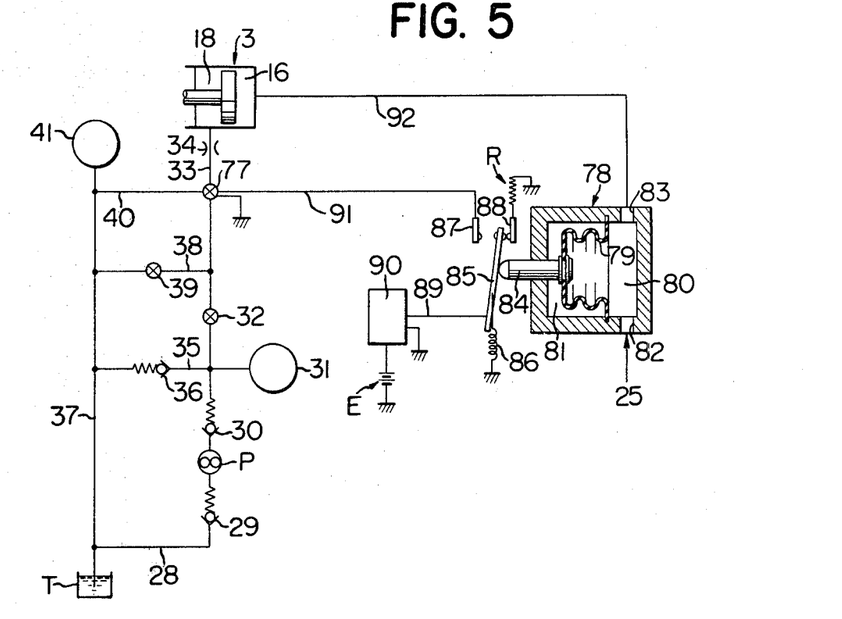
FIG. 5 shows an overall hydraulic system of an anti-skid brake device similar to that shown in FIG. 2 using an electric circuit.

An embodiment in which a valve 77 responsive to brake oil pressure is actuated through an electric circuit is shown in FIG. 5. In FIG. 5, like reference numerals designate parts corresponding to those shown in FIG. 2. A hydraulic switch actuator 78 has an oil chamber 80 and a rear chamber 81 which are separated by a diaphragm 79, the oil chamber 80 being in communication with the oil passage 25 through an opening 82 and in communication with the brake oil chamber 16 through an opening 83 and an oil passage 92. A rod 84 having a base end secured to the diaphragm 79 extends through a wall of the switch actuator 78 in slidably contacting relation so as to protrude outwardly, a foremost end of rod 84 bearing on a switch lever 85.

A power source E is connected to the switch lever 85 through an amplifier 90 and a connection wire 89, the switch lever being normally biased by a tension spring 86 so that the switch lever comes into contact with a contact 88 grounded through a resistor R. When the rod 84 actuates the switch lever 85 against the force of the tension spring 86 so that the switch lever 85 comes into contact with a contact 87 opposite the contact 88, the valve 77 responsive to brake oil pressure which is disposed in the oil passage 28 between the normally closed control valve 32 and the orifice 34 is energized through the connection wire 91.

When not energized, the valve 77 responsive to brake oil pressure causes an output of the normally closed control valve 32 and the control oil chamber 18 to come into communication with the oil passage and cause the output of the normally closed control valve 32 to come into communication with the control oil chamber 18.

Thus, the switch lever 85 does not contact the contact 87 as long as the brake oil pressure within the oil chamber 80 does not reach the predetermined level, and therefore, the valve 77 is not actuated. Hence, even if the normally closed control valve 32 is erroneously opened and the normally open control valve 39 closed, control pressure oil delivered from the pump P is discharged into the oil tank T via the valve 77, the oil passage 40, and low pressure accumulator 41, and the oil passage 37. On the other hand, when the brake oil pressure reaches a level in excess of a predetermined pressure, the switch lever 85 is urged by the rod 84 and comes into contact with the contact 87, and as a result, the valve 77 is energized. Accordingly, the anti-skid device is actuated to open the normally closed control valve 32. When the normally open control valve 39 is closed, control pressure oil delivered from the pump P is introduced into the control oil chamber 18 and the hydraulically-operated device 3 carries out the unbraking operation.

Figure 6:
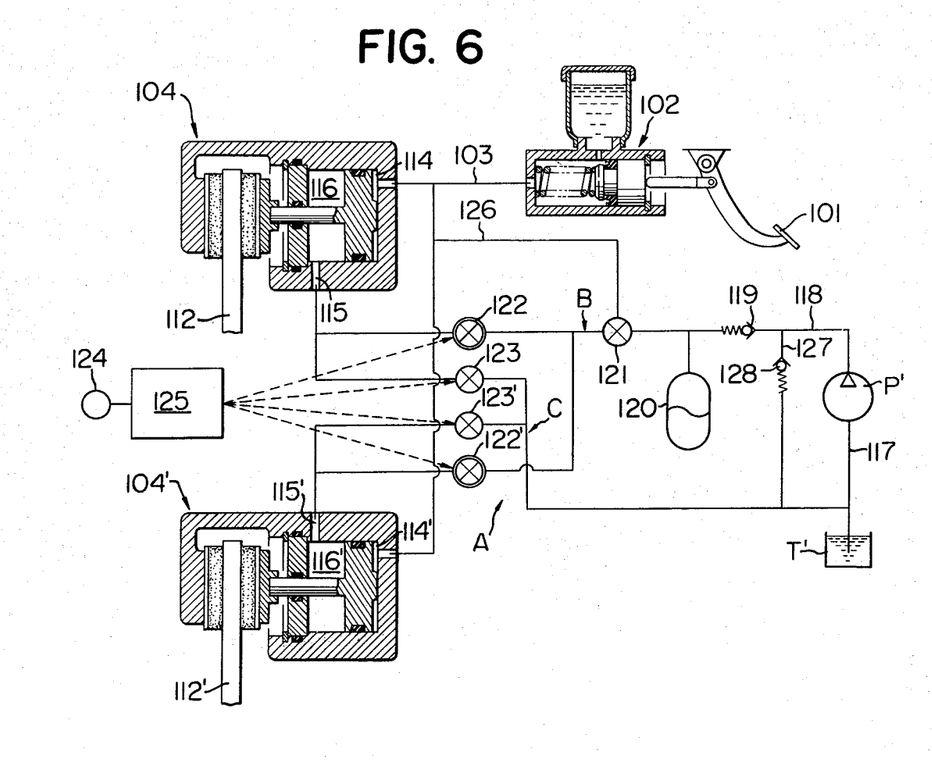
FIG. 6 shows an overall hydraulic system, with a main part shown in section on an enlarged scale, in which the anti-skid brake device of the present invention is applied to two braking devices.

An embodiment in which a vehicular anti-skid brake device in accordance with the present invention is applied to two braking devices is shown in FIG. 6.

Therein, an anti-skid oil pressure control device A has a first oil passage system B and second oil passage system C. In the first oil passage system B, pressurized control oil sucked from an oil tank T' through an oil passage 117 by means of a control oil pressure generating source P' such as a pump passes through an oil passage 118, a check valve 119, an accumulator 120 and a valve 121 responsive to brake oil pressure and thence is fed into a control oil chamber 116 via a normally closed control valve 122 and a port 115 of a braking device 104, and fed to a control oil chamber 116' via a normally closed control valve 122' and a port 115' of a braking device 104'. In the second oil passage system C, control oil within control oil chambers 116 and 116' is returned to the oil tank T' via ports 115 and 115' and normally open control valves 123 and 123', respectively.

The normally closed control valves 122 and 122' and normally open control valves 123 and 123' are each controlled to be opened and closed by a logical control circuit 125 which generates control output signals resulting from a logical operation on the basis of input information fed from a detector 124 which detects essential basic data such as wheel speeds or the like. Of these valves, the normally closed control valves 122 and 122' are each controlled so that they normally remain closed whereas they assume an open position when the braking force of the corresponding braking devices 104 and 105' is excessive. On the other hand, the normally open control valves 123, 123' are each controlled so that they normally remain open whereas they assume a closed position when the braking force of the corresponding braking devices 104 and 104' is excessive.

Valve 121 responsive to brake oil pressure, which is under the influence of the brake oil pressure through an oil passage 126 in communication with an oil passage 103, is normally in closed state, but is placed in open state in response to braking oil pressure when the latter exceeds a predetermined pressure. An oil passage 127 having a relief valve 128 is branched from oil passage 118 between a check valve 119 and a control oil pressure generating source P'. When the control oil pressure within the oil passage 118 exceeds the predetermined pressure, surplus control oil within the oil passage 118 is returned to the oil tank T' through the relief valve 128.

Figure 7:
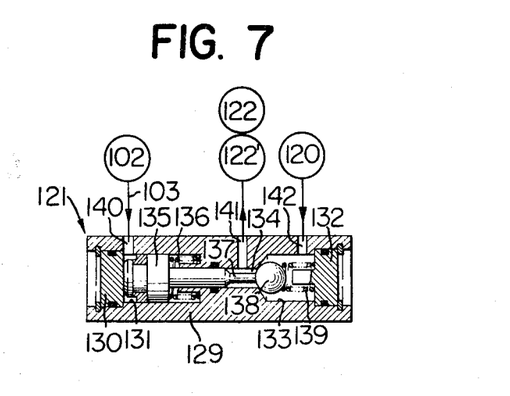
FIG. 7 is a longitudinal sectional view showing one embodiment of a valve responsive to brake oil pressure suitable for use with the vehicular anti-skid brake device shown in FIG. 6.

One embodiment of the detailed construction of the valve 121 responsive to brake oil pressure is shown in FIG. 7. Therein, a casing 129 is interiorly formed with a cylindrical chamber 131 whose outer end if closed by an end wall 130 and a valve chamber 133 whose outer end is closed by an end wall 132. A through-hole 134 axially extends between the chamber 131 and the valve chamber 133. A piston 135, is slidably engaged in the cylindrical chamber 131 and is normally biased by a bias spring 136 toward the end wall 130. The piston 135 has a rod 137 which is slidably engaged within the through-hole 134. The rod 137 has a small-diameter portion at the tip thereof which extends towards a valve seat for a ball valve 138. The ball valve 138 is disposed within the valve chamber 133 and is biased toward the valve seat. The valve seat is formed between the valve chamber 133 and the through-hole 134. The ball valve 138 is biased by a bias spring 139 interposed between the valve ball 138 and the end wall 132. Since the piston 135 normally bears against the end wall 130, the valve ball 138 is seated on the valve seat without being urged by the rod 137 to cut off the valve chamber 133 from the through-hole 134. The cylindrical chamber 131 between the piston 135 and the end wall 130 is in communication with the oil passage 103 through a port 140, an annular chamber formed between the small-diameter portion at the tip of the rod 137 and the through-hole 134 is in communication with each of the normally closed valves 122 and 122' through a port 141, and the valve chamber 133 is in communication with accumulator 120 through a port 142.

Accordingly, when brake oil pressure within the oil passage 103 is below the predetermined pressure, the piston 135 is biased by the bias spring 136 and bears against the end wall 130 so that the ball valve 138 is seated on the valve seat without being acted on by the rod 137 to cut off the valve chamber 133 from the through-hole 134, as a consequence of which the accumulator 120 is cut off from each of the normally closed control valves 122 and 122'. When the brake oil pressure within the oil passage 103 exceeds the predetermined pressure, the piston 135 is moved toward the valve chamber 133 against the biasing force of the bias spring 136, and consequently, the rod 137 urges the ball valve 138 off its seat against the biasing force of the bias spring 139 to cause the valve chamber 133 to communicate with the through-hole 134. As a consequence, the accumulator 120 and the normally closed control valves 122 and 122' come into communication with one another.

From the construction as described above, when the brake pedal 101 is not engaged, the master cylinder 102 will not generate brake oil pressure so that brake oil pressure within the oil passage 103 is below the predetermined pressure, and hence, the valve 121 responsive to brake pressure is in a closed state to cut off the accumulator 120 from each of the normally closed control valves 122 and 122'. Accordingly, at this time, even if the normally closed control valve 122 or 122' is placed in open state as a result of erroneous operation for some reason, control oil delivered from the control oil pressure generating source P' will never flow into the control oil chamber 116 or 116', whereby each of the braking devices 104 and 104' may be held in a state in which the braking force can be generated at any time.

When the brake pedal 101 is stepped on, the master cylinder 102 generates brake oil pressure, and brake oil delivered from the master cylinder 102 flows into each of the brake oil chambers 114 and 114' via the oil passage 103. Consequently, the braking devices 104 and 104' produce a braking force relative to the wheels integral with the corresponding brake disks 112 and 112', respectively. At this time, when brake oil pressure within the oil passage 103 exceeds the predetermined pressure, the valve 121 responsive to brake oil pressure assumes an open position so that control oil having passed through the accumulator 120 reaches each of the normally closed control valves 122 and 122'. However, since each of the normally closed control valves 122 and 122' are held closed as long as the braking force of the braking devices 104 and 104' is adequate, control oil will never flow into the control oil chambers 116 and 116'. During that time, the control oil chambers 116 and 116' are open into the oil tank T' through the normally open control valves 123 and 123', respectively.

When the stepping force on the brake pedal 1 is excessive as to produce excessive braking force in the braking device 104 and 104', the corresponding normally closed control valve 122 or 122' assumes an open position and the corresponding normally open control valve 123 and 123' assumes a closed position, as a consequence of which control oil flows into the control oil chamber 116 or 116' thereby restricting the braking force of the corresponding braking device 104 or 104' to prevent a locking state of the corresponding wheel.

It should be noted that by the provision of the accumulator 120 between the valve 121 responsive to brake oil pressure and the control oil pressure generating source P', oil pressure shock within the oil passage 118 resulting from opening and closing operation of the valve responsive to brake oil pressure and the normally closed control valves 122 and 122' is damped and absorbed by the accumulator 120, thus preventing the oil passage system from undergoing fatigue failure due to oil pressure shock.

Figure 8:
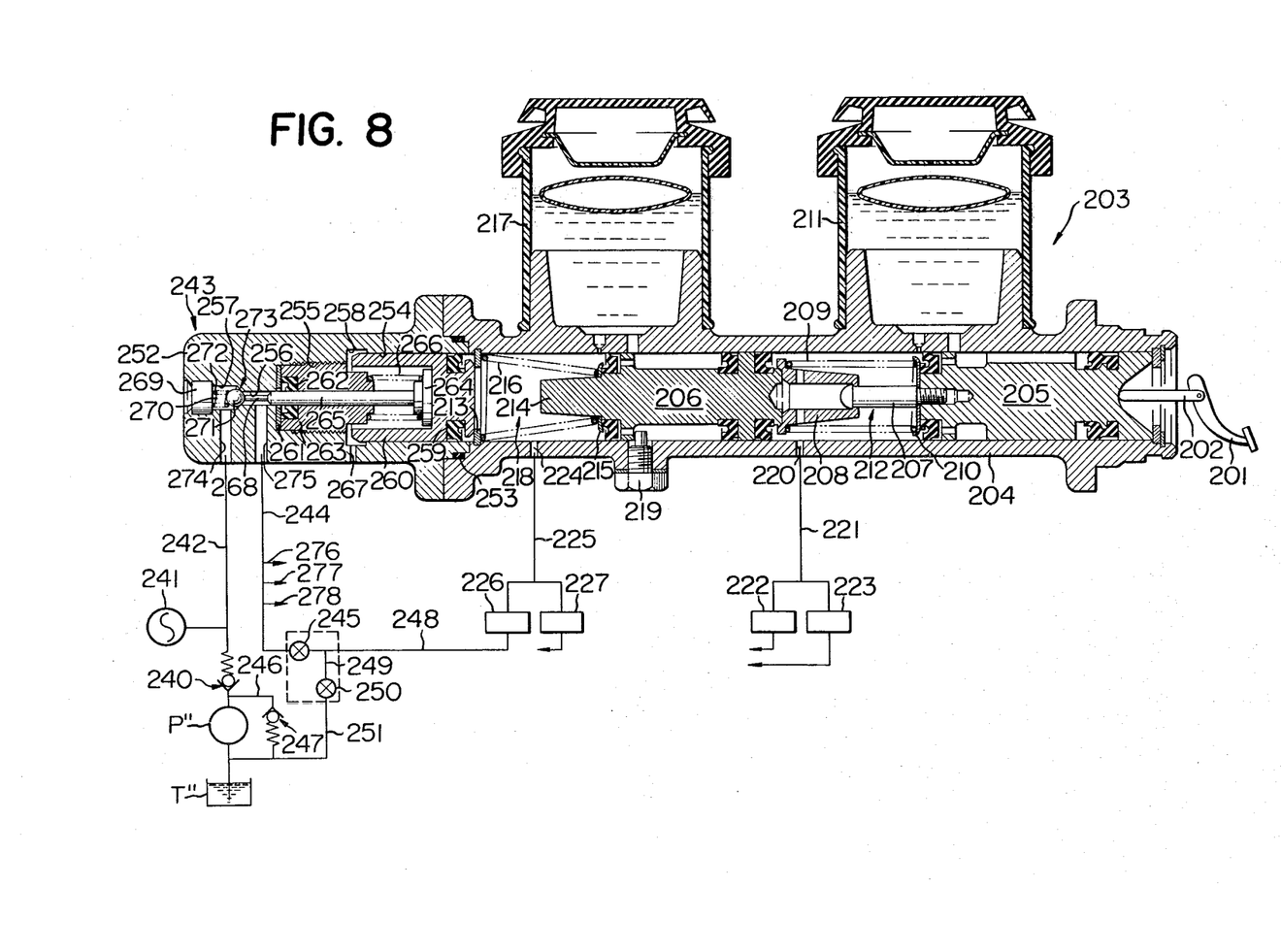
FIG. 8 shows a schematic hydraulic system of the vehicular anti-skid brake device, with a main part shown in section on an enlarged scale, in which a tandem type master cylinder and a valve responsive to brake oil are constructed intergrally with each other.

An embodiment of a vehicular anti-skid brake device, in which a tandem type master cylinder and a valve responsive to brake oil pressure are constructed in the form of an integral structure, is shown in FIG. 8.

Therein, a brake pedal 201 is operatively connected through a push rod 202 to a piston 205 slidably disposed within a cylinder 204 of a tandem type master cylinder 203. The tandem type master cylinder 203 per se is of the well-known type, and the cylinder 204 further slidably receives therein a floating piston 206. A spacing rod 207 extends from the foremost end of the pressing piston 205 and has a spring seat member 208 axially and slidably engaged therewith. A compression spring 209 is interposed between the spring sest member 208 and a spring sest 210 on the end surface of the piston 205. Accordingly, the spacing between the pressing piston 205 and the floating piston 206 is resiliently maintained by the action of the spring seat member 208 and the compression spring 209. A first brake oil pressure generating chamber 212 formed between the piston 205 and the floating piston 206 is supplied with brake oil from a first brake oil storage tank 211 and is adapted to feed brake oil under the pressure generated by the movement of the piston 205 toward the foremost end, to the brake oil chambers in a left front-wheel braking device 222 and a right rear-wheel braking device 223, respectively, through a port 220 and an oil passage 221.

The cylinder 204 has an annular spring seat member 213 secured to the foremost end thereof, and a compression spring 216 is interposed between the annular spring seat member 213 and a spring seat 215 retained slightly rearwardly of a foremost end 214 of the floating piston 206. Accordingly, the spacing between the floating piston 206 and the annular spring seat member 213 is resiliently maintained by the action of the compression spring 216. A second brake oil pressure generating chamber 218 formed on the side of the foremost end of the floating piston 206 is supplied with brake oil from a second brake oil storage tank 217 and is adapted to feed brake oil under the pressure generated by the movement of the floating piston 206 as brake oil pressure within the first brake oil pressure generating chamber 212, to the brake oil chambers in a right front-wheel braking device 226 and a left rear-wheel braking device 227 through a port 224 and an oil passage 225. Mounted on the cylinder 204 is a stopper bolt 219, by which the range of axial movement of the floating piston 206 is controlled. Pressurized control oil sucked from an oil tank T" by a control oil pressure generating source P" such as a pump is fed to a valve 243 responsive to brake oil pressure connected to the master cylinder 203 in the form of an integral construction through a check valve 240, an accumulator 241, and an oil passage 242. At this time, surplus oil out of the control oil fed from the control oil pressure generating source P" is returned to the oil tank T" via an oil passage 246 branched from an oil passage between the source P" and the check valve 240 and a relief valve 247.

The control oil having passed through the valve 243 responsive to brake oil pressure is fed to a control oil chamber in the right front-wheel braking device 226 via an oil passage 244, a normally closed control valve 245 and an oil passage 248. However, oil passages 276, 277 and 278 are branched from the oil passage 244, said oil passages each being provided with a normally closed control valve (not shown) having a function similar to that of the normally closed control valve 245, and control oil having passed through each of these normally closed control valves is fed to the control oil chambers in the left front-wheel braking device 222, the right rear-wheel braking device 223 and the left rear-wheel braking device 227.

The control oil chamber in the right front-wheel braking device 226 may be brought into communication with the interior of the oil tank T" through an oil passage 248, an oil passage 249, a normally open control valve 250 and an oil passage 25. Similarly, control oil chambers in the left front-wheel braking device 222, the right rear-wheel braking device 223 and the left rear-wheel braking device 227 may also be brought into communication with the interior of the oil tank T" through a normally open control valve (not shown) having a function similar to that of the normally open control valve 250.

The valve 243 responsive to brake oil pressure will be described hereinafter. A casing 252 integrally connected through a seal member 253 to the foremost end of the cylinder 204 of the master cylinder 203 is internally formed with a cylindrical chamber 254, a rod guide locking hole 255, an oil hole 256 and a valve chamber forming hole 257 in a direction coaxial with the cylinder 204 successively from the base end thereof. A piston 260 responsive to oil pressure is received through a seal member 259 within the cylindrical chamber 254 in axially slidably contacting relation between a shoulder 258 at the foremost end of the cylindrical chamber 254, and the annular spring seat member 213. The rod guide locking hole 255 threadably receives an outer peripheral portion of a rod guide member 263 having a seal member 262 retained by a seal washer 261 disposed at the foremost end thereof.

A pressing rod 265 axially and slidably extends through the rod guide member 263, the seal member 262 and the oil passing hole 256 and rod 265 has a flange portion 264 formed at the base end thereof. The pressing rod 265 causes the piston 260 responsive to oil pressure to be urged toward the annular spring seat member 213 by the action of a compression spring 266 interposed between the flange portion 264 and the rod guide member 263. A spring chamber formed between the piston 260 and the rod guide member 263 is open to the atmosphere through an open hole 267. The pressing rod 265 is formed at the foremost end thereof with a small diameter portion 268, and an annular chamber formed between the outer peripheral surface of the small diameter portion 268 and the inner peripheral surface of the oil passing hole 256 is in communication with the oil passage 244 through a port 275.

The valve chamber forming hole 257 has a foremost end closed by a closing end wall member 269 and a base end connected to the oil passing hole 256 through a valve seat 273. Between the closing end wall member 269 and the valve seat 273 is formed a valve chamber 270 which comes into communication with the oil passage 242 through a port 274, and a ball valve 271 inserted in the valve chamber 270 is biased toward the valve seat 273 by means of a compression spring 272.

As constructed above, when braking is not applied, neither the first nor second brake oil pressure generating chambers 212 and 218 generates brake oil pressure, the piston 260 responsive to oil pressure and the pressing rod 265 are moved back toward the annular spring seat member 213 by the action of the compression spring 266, and the ball valve 271 is biased toward the valve seat 273 by the action of the compression spring 272, whereby the oil passage 242 is cut off from the oil passage 244. Thereby, even if either normally closed control valve representative of the normally closed control valve 245 incorporated in the respective braking devices 222, 223, 226 and 227 becomes opened as a result of a malfunction of the anti-skid control device during that time, control oil will not flow into the control oil chamber in the braking devices 222, 223, 226 and 227 which incorporate therein the thus opened normally closed control valve.

When the brake pedal 201 is stepped on to cause the pressing piston 205 to be moved toward the foremost end, the floating piston 206 is also moved toward the foremost end by the brake oil pressure generated within the first brake oil pressure generating chamber 212 thereby to generate brake oil pressure also within the second brake oil pressure generating chamber 218. As a consequence, brake oil is introduced into the brake oil chambers in the braking devices 222, 223, 226 and 227 through the oil passages 221 and 225 so that the braking devices 222, 223, 226 and 227 may impart the braking force to the wheels corresponding thereto and the piston 260 responsive to oil pressure receives the pressing force toward the foremost end. Consequently, the rod 265 is moved toward the foremost end against the biasing force of the compression spring 266 to push the ball valve 271 away from the valve seat 273 against the biasing force of compression spring 272 to provide communication between the oil passage 242 and the oil passage 244.

As long as the braking forces of the braking devices 222, 223, 226 and 227 are adequate in a state where the oil passage 242 and the oil passage 244 are in communication with each other, either normally closed control valve incorporated in the braking devices 222, 223, 226 and 227 represented by the normally closed control valve 245 remains closed and either normally open control valve incorporated in the braking devices 222, 223, 226 and 227 represented by the normally open control valve 250 remains open so that the braking force of each of the braking devices 222, 223, 226 and 227 suitably increases in accordance with the braking operation.

Likewise, when the braking force of either braking device from the braking devices 222, 223, 226 and 227 is excessive in the state where the oil passage 242 and the oil passage 244 are in communication with each other, the normally closed control valve incorporated in that braking device becomes opened and the normally open control valve becomes closed, whereby control oil is introduced into the control oil chamber in that braking device and the braking force of the braking device is restricted by the action of the control oil.

It will be noted at the time of braking that in the event the oil passage system including the first brake oil generating chamber 212 has failed, the spacing rod 207 integral with the piston 205 directly presses the floating piston 206 to thereby generate brake oil pressure within the second brake oil pressure generating chamber 218 so that the valve 243 responsive to brake oil is placed in communication state, whereas in the event the oil passage system including the second brake oil pressure generating device 218 has failed, the foremost end 214 of the floating piston 206 directly presses against the piston 260 so that valve 243 is responsive to brake oil pressure.

Figure 9:
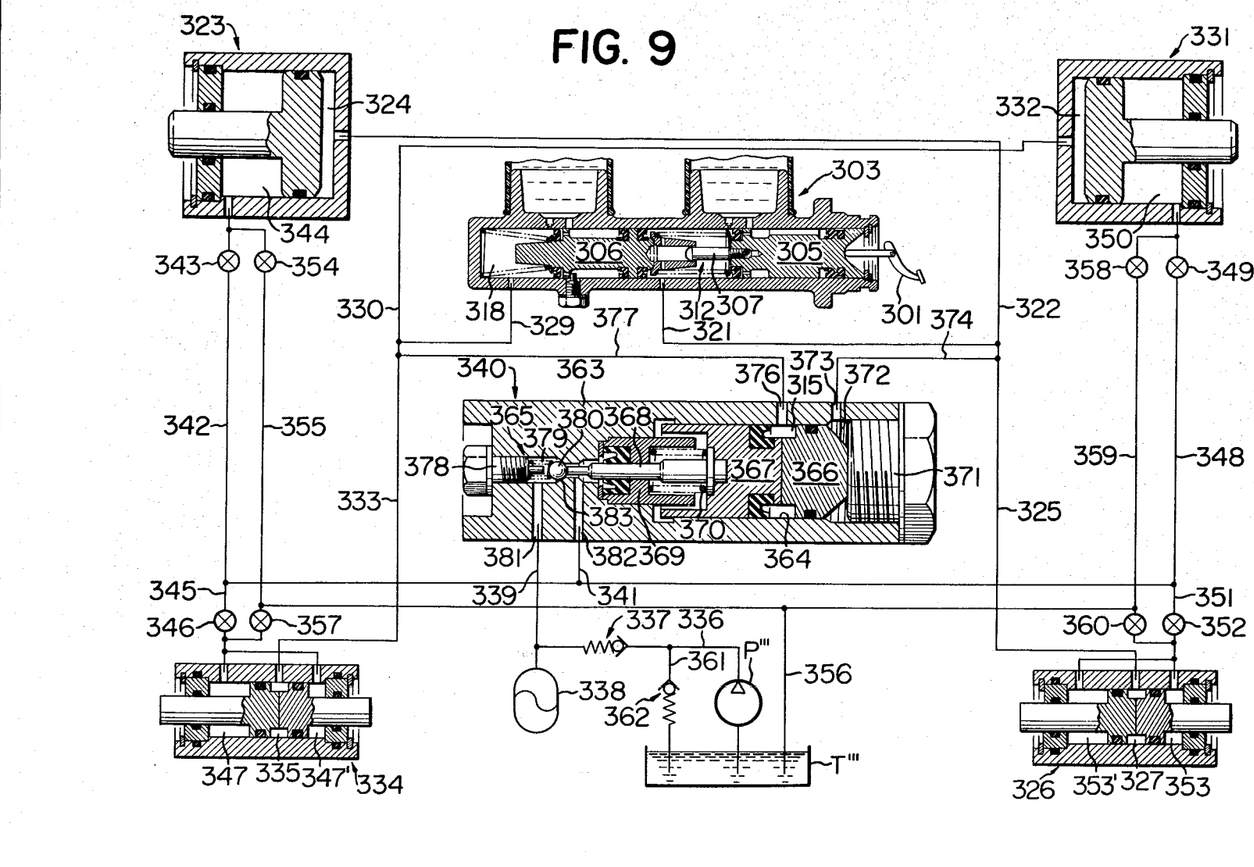
FIG. 9 shows an overall hydraulic system of the vehicular anti-skid brake device, with a main part shown in section on an enlarged scale, in which the tandem type master cylinder and the valve responsive to brake oil are constructed separately.

One embodiment of a vehicular anti-skid brake device, in which the tandem type master cylinder and the valve responsive to brake oil are separately constructed, is shown in FIG. 9.

Therein, pressurized control oil sucked from oil tank T''' by a control oil pressure generating source P''' such as a pump is fed to a valve 340 responsive to brake oil pressure via an oil passage 336, a check valve 337, an accumulator 338 and an oil passage 339 in that order. At this time, surplus oil from the control oil fed from the control oil pressure generating source P''' is returned to the oil tank T''' via an oil passage 361 branched from an oil passage between the control oil pressure generating source P''' and the check valve 337 and a relief valve 362.

Control oil having passed the valve 340 responsive to brake oil pressure is fed to a control oil chamber 344 in a disk brake type left front-wheel braking device 323 via an oil passages 341 and 342, and a normally closed control valve 343, to control oil chambers 347 and 347' in a drum brake type left rear-wheel braking device 334 via an oil passage 345 branched from the oil passage 342 and a normally closed control valve 346, to a control oil chamber 350 in a disk brake type right front-wheel braking device 331 via an oil passage 348 branched from oil passage 341 and a normally closed control valve 349, and to the control oil chambers 353 and 353' in a drum brake type right rear-wheel braking device 326 via an oil passage 351 branched from the oil passage 348 and a normally closed control valve 352.

The control oil chamber 344 in the left front-wheel braking device 323 is in communication with the interior of the oil tank T''' through the normally open control valve 354 and the oil passages 355 and 356; the control oil chambers 347 and 347' in the left rear-wheel braking device 334 are in communication with the interior of the oil tank T''' through the normally open control valve 357 and the oil passage 356; the control oil chamber 350 in the right front-wheel braking device 331 is in communication with the interior of the oil tank T''' through the normally open control valve 358 and the oil passages 359 and 356; and the control oil chambers 353 and 353' in the right rear-wheel braking device 326 are in communication with the interior of the oil tank T''' through the normally open control valve 360 and the oil passage 356.

The normally closed control valves 343, 346, 349 and 352 each normally cut off control oil after having passed the valve 340 responsive to brake oil pressure. However, when the braking force of the corresponding braking devices 323, 334, 331 or 326 relative to the wheels is excessive, it is operatively controlled so that the control oil after having passed through the valve 340 responsive to brake oil pressure is fed to the control oil chambers 344; 347, 347'; 350 or 353, 353' in the corresponding braking devices 323, 334, 331 or 326. The normally open control valves 354, 357, 358 and 360 normally open control oil within the control oil chambers 344, 347, 347'; 350; 353, 353' in the braking devices 323, 334, 331, 326 into the oil tank T'''. However, when the braking force of the corresponding braking devices 323, 334, 331 or 326 relative to the wheels is excessive, it is operatively controlled so as to cut off between the corresponding control oil chambers 344; 347, 347'; 350 or 353, 353' and the oil tank T'''.

Next, the valve 340 responsive to brake oil pressure will be described. The valve 340 comprises casing 363 internally formed with a cylindrical chamber 364 and a valve chamber 365 on the same axis, the cylindrical chamber 364 receiving therein a free piston 366 and a valve operating piston 367 in a state where both pistons may contact and act axially on each other. A rod 368 integral with the valve operating piston 367 slidably extends through a rod guide member 369 to the valve chamber 365, the valve operating piston 367 being biased toward an end wall 371 by the biasing force of a compression spring 370 interposed between the valve operating piston 367 and the rod guide member 369. A first oil pressure chamber 372 formed between the free piston 366 and the end wall 371 is in communication with the first brake oil pressure generating chamber 312 in the tandem type master cylinder 303 through a port 373 and oil passages 374, 325 and 321, whereas a second oil pressure chamber 375 formed between the valve operating piston 367 and the free piston 366 is in communication with a second brake oil pressure generating chamber 318 in the tandem type master cylinder 303 through a port 376 and oil passages 377, 333 and 329.

A ball valve 380 is inserted in the valve chamber 365, the ball valve 380 being biased by the biasing force of a compression spring 379 interposed between a closing end wall member 378 and the valve ball 380 toward a valve seat 383 formed in the passage between a port 381 in communication with the oil passage 339 and a port 382 in communication with the oil passage 341. Accordingly, the valve ball 380 normally cuts off communication between the prot 381 and the port 382, but when brake pressure oil is introduced into one or both first oil pressure chamber 372 and second oil pressure chamber 375 so that the valve operating piston 367 moves and the rod 368 causes the valve ball 380 to be moved off its seat, the port 381 and the port 382 come into communication with one another. At this time, since the free piston 366 and the valve operating piston 367 are merely in contact with each other, even if either oil passage system in communication with the first oil pressure chamber 372 and second oil pressure chamber 375 fails, brake pressure oil is introduced into either one of the first oil pressure chamber 372 or the second oil pressure chamber 375 to thereby provide a positive opening and closing operation of the valve by means of the rod 368.

From the foregoing arrangement, it should be appreciated that when braking is not applied, brake oil pressure is not produced in both the first and second brake oil pressure generating chambers 312 and 318 so that brake oil pressure is not introduced into the first oil pressure chamber 372 and the second oil pressure chamber 375 to provide a cutting off between the port 381 and the port 382. Thus, even if either of the normally closed control valves 343, 346, 349 and 352 incorporated in the braking devices 323, 334, 331 and 326 becomes opened, control oil will never flow into the control oil chambers 344; 347, 347'; 350 or 353, 353' in the braking devices which incorporate the thus opened normally closed control valve.

When the brake pedal 301 is stepped on to cause the pressing piston 305 to be moved toward the foremost end, the floating piston 306 is also moved toward the foremost end by the brake oil pressure generated within the first brake oil pressure generating chamber 312 to thereby produce brake oil pressure also in the second brake oil pressure generating chamber 318. Consequently, brake oil is introduced into the brake oil chambers 324, 335, 332 and 327 in the braking devices 323, 334, 331 and 326 through the oil passages 321, 322, 325 or 329, 330, 333 so that the braking devices 323, 334, 331 and 326 may impart the braking force to the corresponding wheels and at the same time, brake oil is also introduced into the first oil pressure chamber 372 and the second oil pressure chamber 375, resulting in establishing communication between the port 381 and the port 382.

In the state where the port 381 and the port 382 are in communication with each other and as long as the braking force of the braking devices 323, 334, 331 and 326 is adequate, the normally closed control valves 343, 346, 349 and 352 each remain closed and the normally open control valves 354, 357, 358 and 360 each remain opened, and hence, the braking force of the braking devices 323, 334, 331 and 326 freely increases in accordance with the braking operation.

Likewise, in the state where the port 381 and the port 382 are in communication with each other and when the braking force of either of the braking devices 323, 334, 331 and 326 is excessive, the normally closed control valve 343, 346, 349 or 352 incorporated in that braking device becomes opened and the normally open control valve 354, 357, 358 or 360 becomes closed, and hence, control oil is introduced into the control oil chamber 344; 347, 347'; 350 or 353, 353' in that braking device so that the braking force of that braking device is suppressed by the action of said control oil.

Incidentally, in the event the oil passage system including the first brake oil pressure generating chamber 312 fails when braking is applied, the spacing rod 307 integral with the pressing piston 305 directly presses the floating piston 306 so that brake oil pressure may be generated within the second brake oil pressure generating chamber 318. As a consequence, the brake oil may be fed to the right front-wheel braking device 331 and the left rear-wheel braking device 334 and at the same time, the brake oil is also introduced into the second oil pressure chamber 375 to thereby bring the port 381 and the port 382 into communication with each other. Also, in the event the oil passage system including the second brake oil pressure generating chamber 318 fails, brake oil may be fed to the left front-wheel braking device 323 and the right rear-wheel braking device 326 by the brake oil pressure generated within the first brake oil pressure generating chamber 312 and at the same time, the port 381 and the port 382 may be brought into communication with each other by the action of the brake oil introduced into the first oil pressure chamber 372.

Other embodiments and modifications of this invention will suggest themselves to those skilled in the art, and such of these as come within the spirit of this invention are included within its scope as best defined by the appended claims.

What is claimed is:

1. A vehicular anti-skid brake device comprising a brake oil pressure generating oil source, a separate control oil pressure generating source, at least one braking device provided with a brake oil chamber connected to receive brake oil pressure generated in said brake oil pressure generating source so as to produce a braking force and a control oil chamber connected to receive control oil pressure generated in said control oil pressure generating source; and valve means responsive to brake oil pressure so that when said brake oil pressure is below a predetermined value, working oil within said control oil chamber and control pressure oil delivered from said control oil pressure generating source are released and when said brake oil pressure exceeds a predetermined level, control pressure oil delivered from said control oil pressure generating source is introduced into said control oil chamber.

2. The vehicular anti-skid brake device according to claim 1, comprising an oil passage with an orifice therein connecting said control oil chamber and said valve means.

3. The vehicular anti-skid brake device according to claim 1, wherein said valve means responsive to brake oil pressure comprises a hydraulic piston operated in response to said brake oil pressure.

4. The vehicular anti-skid brake device according to claim 1, wherein said valve means responsive to brake oil pressure comprises a diaphragm responsive to said brake oil pressure.

5. A vehicular anti-skid brake device comprising a brake oil pressure generating oil source, a separate control oil pressure generating source, braking means actuated by brake oil pressure generated by said brake oil pressure generating oil source in accordance with a braking operation for imparting a braking force to wheels of the vehicle, and an anti-skid oil pressure control means connected to receive control oil from said control oil pressure generating source when the braking force to the wheels is excessive for applying control oil pressure to said braking means so that the braking force of said braking means may be suppressed, said anti-skid oil pressure control means comprising a first oil passage system for bringing said braking means into communication with said control oil pressure generating source through normally closed control valves which are so controlled that said valves are normally in closed position but when the braking force of said braking means is excessive, said valves become opened, and a second oil passage system for bringing said braking means into communication with an oil tank through normally open control valves which are so controlled that said valves are normally in open position but when the braking force of said braking devices is excessive, said valves become closed, said first oil passage system comprising a further valve responsive to brake oil pressure disposed between said normally closed control valves and said control oil pressure generating source, said further valve being normally closed but assuming an open state in response to brake oil pressure when the brake oil pressure exceeds a predetermined level to thereby bring said control oil pressure generating source into communication with said normally closed control valves.

6. The vehicular anti-skid brake device according to claim 5, wherein said first oil passage system comprises an oil passage which connects said further valve with said control oil pressure generating source, and an accumulator in said oil passage.

7. A vehicular anti-skid brake device comprising a master cylinder for generating brake oil pressure in accordance with a braking operation; braking means connected to receive brake oil pressure generated by said master cylinder and including a brake oil chamber to impart a braking force to the wheels of a vehicle, and a control oil chamber for receiving control oil pressure acting in opposition to the brake oil pressure when the braking force exceeds a predetermined value to suppress the braking force; a control oil pressure generating source for generating said control oil pressure; a valve means responsive to brake oil pressure integrally connected to said master cylinder for directly receiving brake oil pressure generated by said master cylinder, said valve means normally cutting off control pressure oil delivered from said control oil pressure generating source but permitting control pressure oil delivered from said control oil pressure generating source to flow when the brake oil pressure generated by said master cylinder reaches a level exceeding a predetermined pressure; a normally closed control valve which is so controlled as to normally cut off control pressure oil after having passed through said valve means but to feed said control pressure oil after having passed through said valve means to said control oil chamber when the braking force of said braking means exceeds said predetermined value; and a normally open control valve which is so controlled as to normally permit flow of the control oil within said control oil chamber to an oil tank and to selectively cut-off communication between said control oil chamber and said oil tank.

8. The vehicular anti-skid brake device according to claim 7, wherein said braking means comprises disk-brake type braking devices.

9. The vehicular anti-skid brake device according to claim 7, wherein said master cylinder comprises a tandem type master cylinder.

10. A vehicular anti-skid brake device comprising a tandem type master cylinder for generating brake oil pressure in accordance with a braking operation; a plurality of braking means each for a respective one of a plurality of wheels, said braking means including respective brake chambers connected to receive brake oil pressure generated by said tandem type master cylinder to impart a braking force to the corresponding wheels, said braking means further including respective control oil chambers connected to receive control oil pressure acting in opposition to the brake oil pressure when the braking force exceeds a predetermined level to suppress the braking force; a control oil pressure generating source for generating said control oil pressure; valve means responsive to brake oil pressure, said valve means receiving brake oil pressure generated by said tandem type master cylinder and normally cutting off control pressure oil delivered from said control oil pressure generating source and permitting said control pressure oil delivered from said control oil pressure generating source to flow only when said brake oil pressure generated by said tandem type master cylinder reaches a level in excess of a predetermined pressure; normally closed control valves which are so controlled as to normally cut off control pressure oil after having passed through said valve means but to feed control pressure oil having passed through said valve means to said control oil chambers in said braking means when the braking force of said braking devices exceeds said predetermined level; and normally open control valves which are so controlled as to normally permit flow of control oil in said control oil chambers in said braking means to an oil tank and to selectively cut-off communication between said control oil chambers and said oil tank when the braking force of said braking devices exceeds said predetermined value.

11. The vehicular anti-skid brake device according to claim 10, wherein said tandem type master cylinder includes two brake oil pressure systems, said valve means which is responsive to brake oil pressure comprising a free piston axially movable in accordance with the brake oil pressure in one of the two brake oil pressure systems in said tandem type master cylinder, and a valve-operating piston arranged coaxially with said free piston, said valve-operating piston being coupled with said free piston and receiving a pressure force from said free piston, said valve means comprising a valve mechanism associated with said valve-operating piston such that said valve-operating piston can directly open and close said valve mechanism and is capable of directly opening and closing said valve mechanism only by the brake oil pressure in the other of said two brake pressure systems of said tandem type master cylinder.

12. The vehicular anti-skid brake device according to claim 10, wherein said tandem type master cylinder includes therein brake oil pressure generating pistons responsive to a braking operation arranged so that one of two brake oil pressure systems takes over a portion of several braking operations of said braking means and the other system takes over the remaining portion of braking operations of said braking means.

13. The vehicular anti-skid brake device according to claim 10, wherein at least one of said braking means comprises a disk-brake type braking device and another of said braking devices is a drum-brake type braking device.

* * * * *